UNITED STATES PATENT OFFICE.

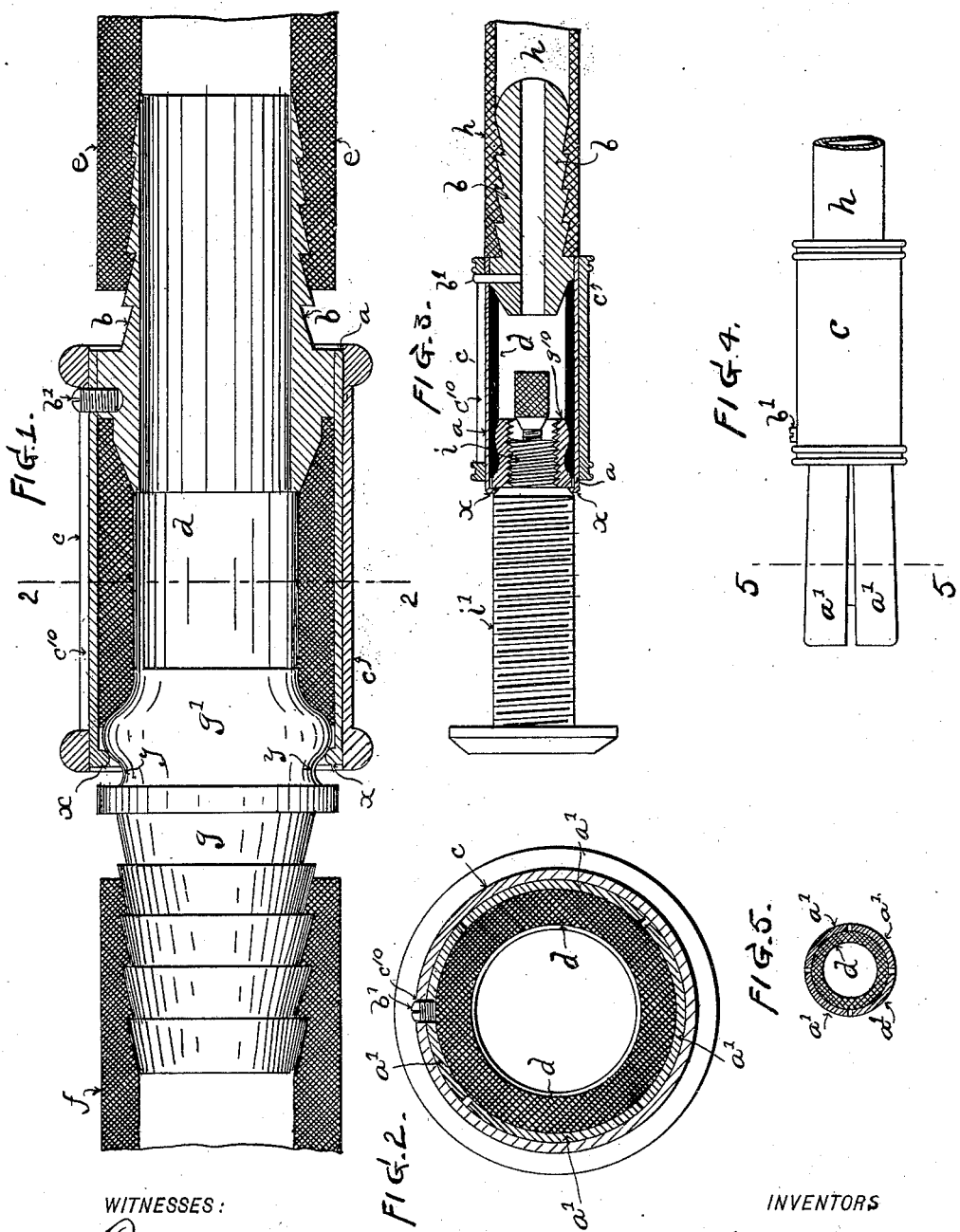

BENJAMIN VERGÉ, OF PARIS, AND EMILE DAGAIN, OF NARBONNE, FRANCE.

PIPE-UNION.

SPECIFICATION forming part of Letters Patent No. 676,286, dated June 11, 1901.

Application filed May 3, 1900. Serial No. 15,404. (No model.)

*To all whom it may concern:*

Be it known that we, BENJAMIN VERGÉ, builder, of Paris, and EMILE DAGAIN, builder, of Narbonne, in the French Republic, have invented a certain new and useful Pipe-Union, of which the following is a full, clear, and exact description.

This invention relates to a union or connection for, in general, quickly effecting the junction of two tubes, pipes, or the like. It is particularly applicable to the connection with the valves of pneumatic tires of the pump for inflating the said tires.

Upon the accompanying drawings two forms of application of our invention are illustrated by way of example.

Figure 1 shows in longitudinal section a union or connection more particularly constructed for pipes of large size, such as water-pipes, hose-pipes, and the like. Fig. 2 is a cross-section on line 2 2 of Fig. 1. Fig. 3 is a longitudinal section of an improved connection applied to the valve of a tire and to a pump for inflating the same. Fig. 4 shows in elevation the connection when in the unclasping position. Fig. 5 is a cross-section on line 5 5 of Fig. 4.

Our union in every case comprises, essentially, a cylindrical socket $a$, rendered integral with a metallic tubular portion $b$ by a pin, peg, or the like $b'$ or in any other suitable manner. The socket $a$ is provided with several longitudinal slots, forming a certain number of flexible plates or bushes $a'$ $a'$—four, for example—and are formed with turned-over ends $x$ $x$. Upon this socket $a$ is mounted, frictionally, a ring or sleeve $c$, which can be slid thereon. We prefer to form the sleeve $c$ with a groove $c^{10}$, into which the head of the screw $b'$ may protrude to form a stop for the sleeve. Within the socket $a$ is inserted a short length of rubber tubing, which bears upon the end of the tube $b$ and also terminates at or near the end of the socket $a$.

In order to effect the junction of two pipes, (designated on the drawings $e$ and $f$,) the end of one of them is slipped upon the tubular portion $b$. The other is passed onto a similar tubular portion $g$, the inner end $g'$ of which is shaped with an enlarged end and a groove $y$ in such manner as to be able to engage the end of the interior rubber tube $d$ and to slightly distend it. The sliding sleeve $c$ being moved so as to free the flexible parts of the split socket $a'$, the tubular portion $g'$ is inserted into the tube $d$. The latter being distended causes the widening or forcing outwardly of the flexible plates $a'$, and the sleeve $c$ is then slid so as to bring it over these latter, and thus to effect a clasping or contractile action of the said plates. The latter are then brought together and compress the rubber tube $d$ around the end $g'$ of the tubular portion, forcing the turned-over portions of the flexible tube into the groove $y$ of the tubular portion $g$, and this securely connects these two portions and effects an air-tight joint between them. In order to separate them afterward, we have only to move the sleeve $c$ so as to disengage the flexible plates $a'$, which thereupon cease to clasp the tube $d$.

When our joint or union is employed to connect a tire-valve with an ordinary pump connection, Figs. 3, 4, and 5, the joint or union itself, as before described, forms part of the tube or connection $h$, the tubular portions $g$ $g'$ being then replaced by an ordinary cone $g^{10}$, which is screwed upon the threaded portion $i$ of the valve $i'$, and upon this cone $g^{10}$ the tube $d$ of the joint is adjusted.

We may apply this improved union or coupling to purposes other than those referred to, and the union may be modified in shape and also be made of any convenient sizes.

We claim as our invention—

A pipe-union or the like, comprising a slotted cylindrical socket, having at one end turned-over ends $x$ $x$, and secured at the other end to a pipe, a hollow flexible tube in the interior of the slotted socket and a sleeve surrounding the outside of the slotted socket and adapted to be slid thereon, in combination with a second pipe having a terminal with an enlarged end, a groove $y$ behind said enlarged end, whereby on the insertion of the enlarged end into the slotted socket, and upon the sliding of the sleeve thereon, the turned-over ends of the slotted socket will positively hold the two pipes against parting longitudinally and at the same time the enlarged end will compress the flexible inner tube of the coupling to form a tight joint.

In testimony whereof we have signed our names to this specification in the presence of the subscribing witnesses.

BENJAMIN VERGÉ.
EMILE DAGAIN.

Witnesses as to Benjamin Vergé:
  GUSTAVE DUMONT,
  EDWARD P. MACLEAN.
Witnesses as to Emile Dagain:
  JULES BERG,
  T. DINISON.